United States Patent
Lan

[11] Patent Number: 6,073,957
[45] Date of Patent: Jun. 13, 2000

[54] CONNECTING DEVICE FOR A STROLLER FRAME

[76] Inventor: Red Lan, 15F, No. 108, Sec. 1, Hsin-Tai 5th Rd., Hsichih Chen, Taipei Hsien, Taiwan

[21] Appl. No.: 09/195,813

[22] Filed: Nov. 19, 1998

[51] Int. Cl.[7] .................................................. B62B 7/06
[52] U.S. Cl. ...................... 280/642; 280/650; 280/47.38; 403/102; 74/551.3
[58] Field of Search ..................... 280/638, 639, 280/642, 647, 650, 648, 655, 657, 658, 47.38; 403/102, 325; 74/551.3, 551.2, 529

[56] References Cited

U.S. PATENT DOCUMENTS

| | | | |
|---|---|---|---|
| 5,645,293 | 7/1997 | Cheng | 280/642 |
| 5,769,447 | 6/1998 | Huang | 280/642 |
| 5,823,564 | 10/1998 | Kettler | 280/642 |
| 5,876,057 | 3/1999 | Huang | 280/642 |
| 5,882,030 | 3/1999 | Haut | 280/642 |
| 5,934,153 | 8/1999 | Yang | 74/551.3 |
| 5,938,229 | 8/1999 | Chen et al. | 280/642 |

*Primary Examiner*—Peter C. English
*Assistant Examiner*—Ruth Ilan

*Attorney, Agent, or Firm*—Renner, Otto, Boisselle & Sklar LLP

[57] ABSTRACT

A connecting device for a stroller frame includes a pivot seat for connecting pivotally a connecting section of a handle portion to a leg portion of the stroller frame, a locking seat for locking releasably the connecting section to the leg portion, an operating member operable to move the locking seat for unlocking the connecting section from the leg portion, a linking rod interconnecting the operating member and the locking seat, and a biasing unit for biasing the locking seat to a locking position. The biasing unit is received in the connecting section, and includes an elongated spring mounting seat which has a bottom end secured to the connecting section, and a surrounding wall formed with a spring chamber and an elongated second slot communicated with the spring chamber and registered with a first slot in the connecting section. The biasing unit further includes a coiled compression spring retained in the spring chamber. The linking rod extends through the compression spring, and is pulled downwardly by virtue of the compression spring to normally bias the locking seat to the locking position for locking the connecting section to the leg portion.

3 Claims, 7 Drawing Sheets

CONNECTING DEVICE FOR A STROLLER FRAME

BACKGROUND OF THE INVENTION

1. Field of the Invention

This invention relates to a connecting device for a stroller frame, more particularly to a connecting device for connecting a handle portion and a leg portion of a stroller frame.

2. Description of the Related Art

FIG. 1 illustrates a stroller frame 1 which includes a parallel pair of front leg portions 11 (only one front leg portion 11 is shown), a handle portion 12 with a parallel pair of connecting sections 121 (only one connecting section 121 is shown) connected to the front leg portions 11 by means of a pair of connecting devices 2 (only one connecting device 2 is shown), and a pair of rear leg portions 14 (only one rear leg portion 14 is shown) mounted on the connecting sections 121 by means of a pair of pivot plates 13 (only one pivot plate 13 is shown). Each of the front and rear leg portions 11, 14 has a bottom end provided with a wheel 15. Each connecting device 2 includes a pivot seat 20 mounted on the respective front leg portion 11. A lower end of the respective connecting section 121 of the handle portion 12 is pivoted to the pivot seat 20 about a pivot shaft 21. A locking seat 23 is mounted slidably on the respective connecting section 121 by means of an insert pin 22, and is formed with an engaging hole 231 for engaging a top end of the respective front leg portion 11. A tension spring 24 is disposed in the respective connecting section 121, and has an upper end hooked at the insert pin 22 and a lower end hooked at the pivot shaft 21. The insert pin 22 is biased downwardly by the tension spring 24 in order to move the locking seat 23 downwardly so that the engaging hole 231 engages the top end of the respective front leg portion 11, thereby locking the respective connecting section 121 of the handle portion 12 in an unfolded position. An operating member 25 is mounted slidably on the respective connecting section 121. A linking rod 251 has an upper end connected to the operating member 25, and a lower end connected to the insert pin 22. The operating member 25 is operable to move the insert pin 22 upwardly against the biasing action of the tension spring 24 so as to disengage the top end of the respective front leg portion 11 from the engaging hole 231 of the locking seat 23 and to permit pivoting movement of the handle portion 12 relative to the front leg portion 11 about the pivot shaft 21 for folding the stroller frame 1.

The connecting device 2 achieves the purposes of connecting the front leg portion 11 to the handle portion 12, and of locking releasably the handle portion 12 in the unfolded position. However, during the installation of the connecting device 2 on the stroller frame 1, the tension spring 24 should be disposed in the connecting section 121 of the handle portion 12 with the upper end of the tension spring 24 hooked at the insert pin 22 and the lower end of the tension spring 24 hooked at the pivot shaft 21. This results in many difficulties during installation of the connecting device 2 that complicate production of the stroller frame 1.

SUMMARY OF THE INVENTION

Therefore, the object of the present invention is to provide a connecting device which can be easily installed on a stroller frame for connecting a leg portion and a handle portion of a stroller frame.

Accordingly, the connecting device of the present invention includes a pivot seat, a locking seat, an operating member, a linking rod, and a biasing unit. The pivot seat is adapted to connect pivotally a connecting section of the handle portion and the leg portion such that the connecting section of the handle portion is pivotable relative to the leg portion between an unfolded position, in which the connecting section of the handle portion extends upwardly relative to the leg portion and is disposed side-by-side with the leg portion, such that the connecting section of the handle portion is generally parallel to the leg portion, and a folded position. The locking seat is adapted to be mounted slidably on the connecting section of the handle portion. The locking seat is adapted to be disposed above a top end of the leg portion when the connecting section of the handle portion is in the unfolded position. The locking seat is provided with a downwardly opening engaging chamber adapted to engage the top end of the leg portion, and an insert pin adapted to extend through the first slot in the connecting section so that the locking seat is adapted to move slidably on the connecting section of the handle portion between a locking position, in which the engaging chamber engages the top end of the leg portion to lock the connecting section of the handle portion in the unfolded position, and an unlocking position, in which the engaging chamber is disengaged from the top end of the leg portion to permit movement of the connecting section of the handle portion to the folded position. The operating member is adapted to be mounted slidably on the connecting section of the handle portion above the locking seat. The linking rod is adapted to be mounted on the connecting section of the handle portion, and has an upper end connected to the operating member, and a lower end connected to the insert pin. The biasing unit is adapted to be received in the connecting section of the handle portion. The biasing unit includes an elongated spring mounting seat which has a bottom end adapted to be secured to the connecting section, and a top end that permits extension of the linking rod into the spring mounting seat. The spring mounting seat has a surrounding wall formed with upper and lower spring retaining portions which project inwardly from the surrounding wall and which define a spring chamber therebetween. The surrounding wall is further formed with an elongated second slot communicated with the spring chamber and adapted to be registered with the first slot in the connecting section. The biasing unit further includes a coiled compression spring retained between the upper and lower spring retaining portions. The linking rod extends through the compression spring. The insert pin extends through the spring chamber and the second slot, and is disposed below the compression spring so as to be biased downwardly by the compression spring, thereby pulling the linking rod downwardly to bias the locking seat normally to the locking position. The operating member is operable to move the linking rod upwardly against biasing action of the compression spring so as to move the locking seat to the unlocking position.

BRIEF DESCRIPTION OF THE DRAWINGS

Other features and advantages of the present invention will become apparent in the following detailed description of the preferred embodiment with reference to the accompanying drawings, in which.

DETAILED DESCRIPTION OF THE PREFERRED EMBODIMENT

Figure 1:
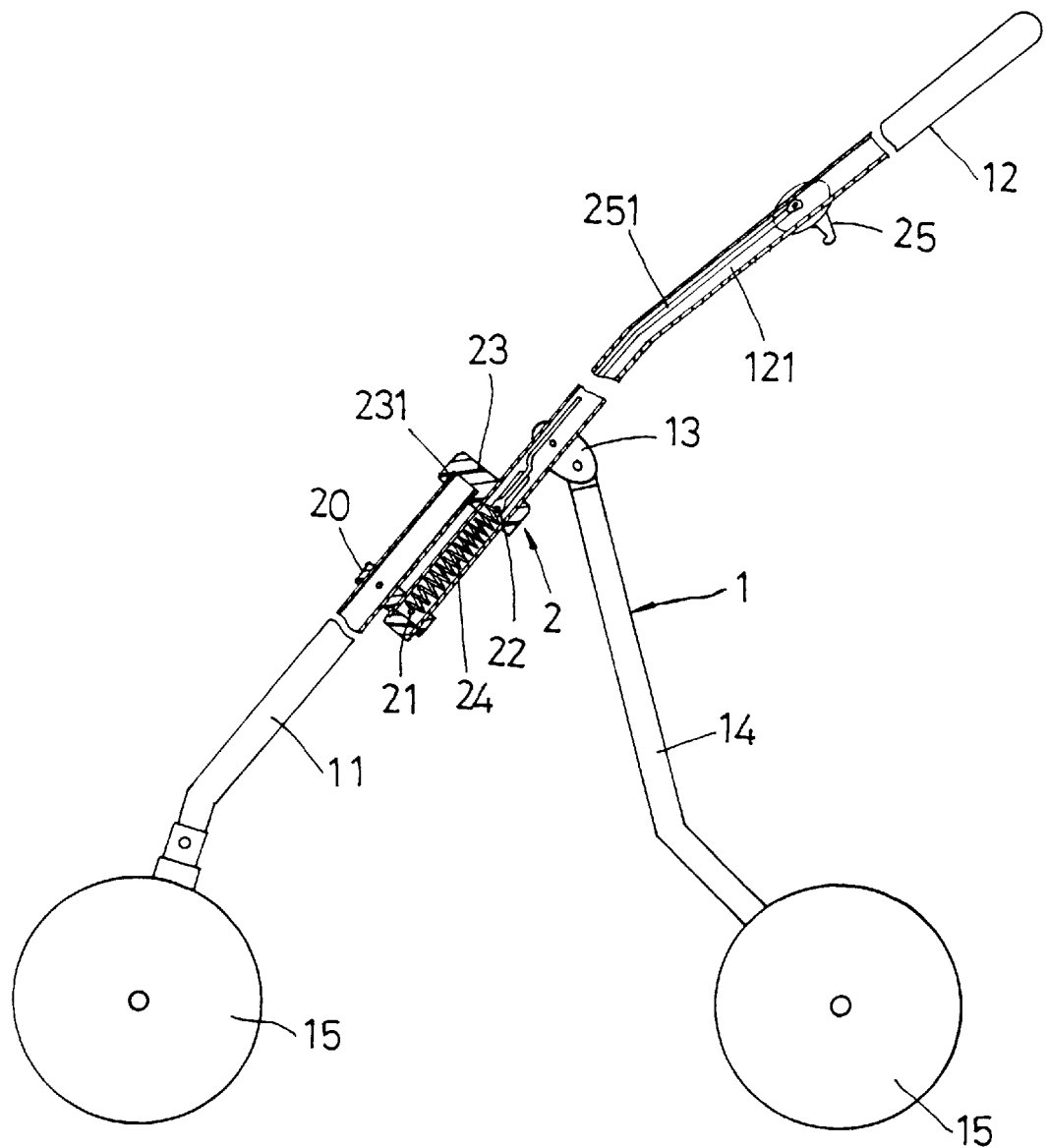
FIG. 1 is a partly sectional, schematic side view of a stroller frame incorporating a conventional connecting device.
Figure 2:
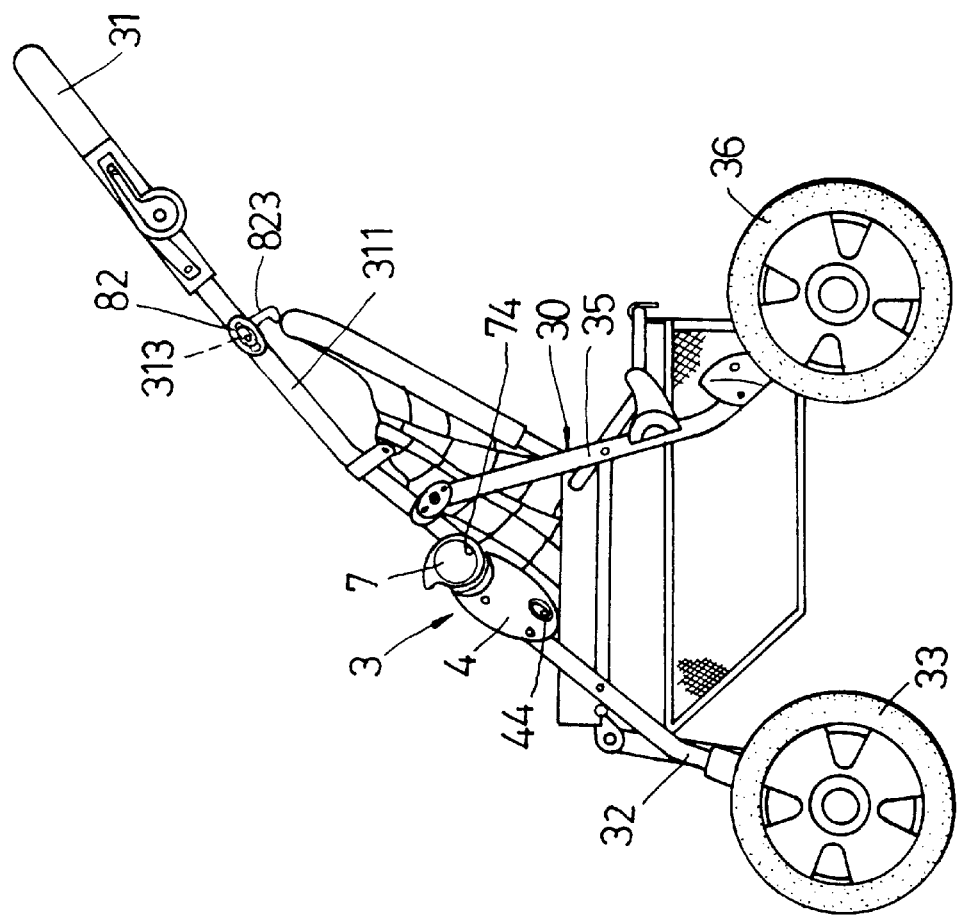
FIG. 2 is a side view of a stroller which incorporates a preferred embodiment of the connecting device of the present invention, where the stroller is illustrated in an unfolded position.

Referring to FIG. 2, the preferred embodiment of the connecting device 3 according to the present invention is shown to be mounted on a stroller frame 30 of a stroller. The stroller frame 30 includes a handle portion 31 with a parallel pair of connecting sections 311 (only one is shown), a parallel pair of front leg portions 32 (only one is shown), and a parallel pair of rear leg portions 35 (only one is shown). Each of the front and rear leg portions 32, 35 is provided with a wheel 33, 36 thereon. A pair of the connecting devices 3 of the preferred embodiment are mounted on the stroller frame 30 to interconnect the connecting sections 311 of the handle portion 31 and the front leg portions 32. As shown, when the stroller is unfolded, the connecting sections 311 extend upwardly and rearwardly relative to the front leg portions 32, and are disposed side-by-side with the front leg portions 32 such that the connecting sections 311 are generally parallel to the front leg portions 32. The present invention is illustrated in terms of the connecting device 3 mounted on the left-hand side of the stroller frame 30.

Figure 3:
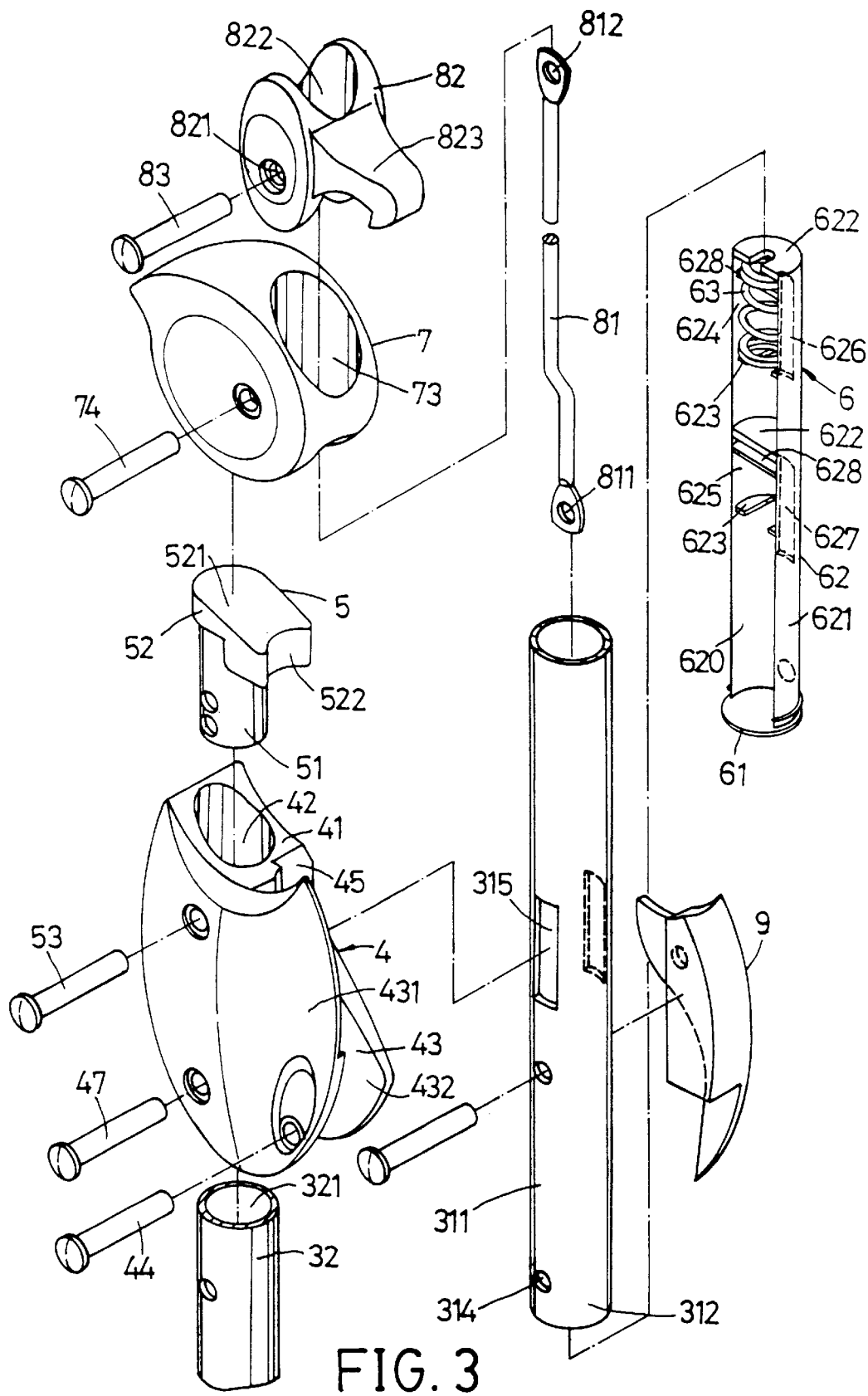
FIG. 3 is an exploded perspective view illustrating the connecting device of the preferred embodiment.

Referring to FIGS. 2 and 3, the connecting section 311 of the handle portion 31 is formed as a hollow tube, and has an open lower end 312. The connecting section 311 is formed with an elongated hole 313, a pair of diametrically opposite, axially extending first slots 315 below the elongated hole 313, and a radial pivot hole 314 at the lower end 312. The front leg portion 32 is formed as a hollow tube, and has an open top end 321. The connecting device 3 of the preferred embodiment includes a pivot seat 4, a locking member 5, a locking seat 7, an operating member 82, a linking rod 81, and a biasing unit 6.

Figure 4:
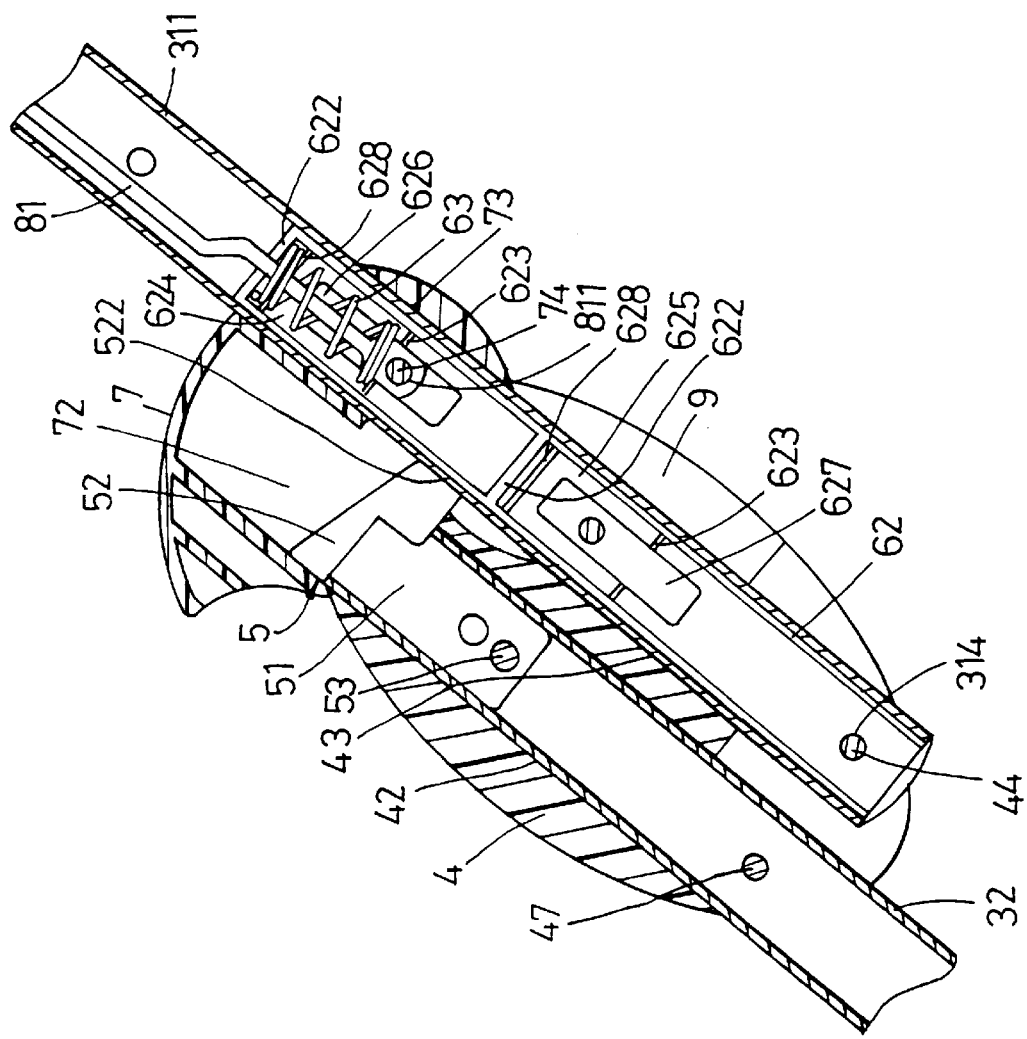
FIG. 4 is a fragmentary cross-sectional view illustrating the connecting device of the preferred embodiment, where a locking seat of the connecting device is illustrated in a locking position.

Referring to FIGS. 3 and 4, the pivot seat 4 is a generally oval-shaped body with a top end formed with a concave indentation 41. The pivot seat 4 includes a tubular sleeve 42, and has a receiving groove 43 which is formed posteriorly of the tubular sleeve 42 and which opens rearwardly. The receiving groove 43 is defined by inner and outer side walls 432, 431 that extend rearwardly from the tubular sleeve 42. The tubular sleeve 42 is adapted to be sleeved on the front leg portion 32, and is adapted to be secured to the top end 321 of the front leg portion 32 by means of a lower fastening pin 47. The receiving groove 43 is adapted to permit extension of the connecting section 311 thereinto. The pivot seat 4 is provided with a pivot shaft 44 which extends through the outer and inner side walls 431, 432 of the receiving groove 43 and which is adapted to extend through the pivot hole 314 to mount pivotally the lower end 312 of the connecting section 311 to the pivot seat 4 such that the connecting section 311 is pivotable relative to the front leg portion 32 between an unfolded position, in which the connecting section 311 extends upwardly relative to the front leg portion 32 and is disposed side-by-side with the front leg portion 32 such that the connecting section 311 is generally parallel to the front leg portion 32, as shown in FIG. 2, and a folded position. The inner side wall 432 of the receiving groove 43 is formed with a curved notch 45.

The locking member 5 has an insert section 51 adapted to be inserted into the open top end 321 of the front leg portion 32, and an engaging protrusion 52 formed on a top end of the insert section 51. The insert section 51 is secured to the pivot seat 4 and is adapted to be secured to the top end 321 of the front leg portion 32 by means of an upper fastening pin 53 such that the engaging protrusion 52 projects upwardly from the pivot seat 4 and is adapted to project from the top end 321 of the front leg portion 32. The engaging protrusion 52 has an inclined top face 521 that inclines downwardly and rearwardly, and a concave face 522 which faces rearwardly and which is adapted to abut against the connecting section 311 when the connecting section 311 is moved to the unfolded position.

The locking seat 7 is adapted to be mounted slidably on the connecting section 311, and has a front portion formed with an engaging chamber 72 that opens downwardly, and a rear portion formed with a vertical insert hole 73 which is adapted to permit extension of the connecting section 311 therethrough. The engaging chamber 72 is registered with the engaging protrusion 52 of the locking member 5, and is disposed on the concave indentation 41 of the pivot seat 4 when the connecting section 311 is moved to the unfolded position, and thus permits extension of the engaging protrusion 52 thereinto to engage the same. The locking seat 7 is provided with an insert pin 74 which is adapted to extend through the first slots 315 in the connecting section 311 such that the locking seat 7 is slidable on the connecting section 311 between a locking position, in which the engaging chamber 72 of the locking seat 7 engages the engaging protrusion 52 of the locking member 5 to lock the connecting section 311 in the unfolded position, and an unlocking position, in which the engaging protrusion 52 is disengaged from the engaging chamber 72 to permit movement of the connecting section 311 to the folded position.

The operating member 82 has a sleeve portion 822 which is adapted to be sleeved on the connecting section 311 above the locking seat 7 and which is formed with a radial hole 821, and an operating projection 823 which projects radially from the sleeve portion 822.

The linking rod 81 is adapted to be disposed in the connecting section 311 of the handle portion 31. The linking rod 81 has a lower end formed with a lower positioning hole 811 which permits extension of the insert pin 74 therethrough, and an upper end formed with an upper positioning hole 812 registered with the radial hole 821 in the operating member 82. A pin 83 extends through the radial hole 821 in the operating member 82 and the upper positioning hole 812 of the linking rod 81, and is adapted to extend through the elongated hole 313 (see FIG. 2) in the connecting section 311 to mount the linking rod 81 and the operating member 82 slidably on the connecting section 311.

The biasing unit 6 is adapted to be received in the connecting section 311 of the handle portion 31, and includes an elongated spring mounting seat 62 and a coiled compression spring 63. The spring mounting seat 62 is adapted to be inserted into the connecting section 311 via the open lower end 312 of the latter such that a bottom wall 61 of the spring mounting seat 62 abuts against the lower end 312 of the connecting section 311. The pivot shaft 44, which extends through the pivot hole 314 of the connecting section 311, also extends through a bottom end of the spring mounting seat 62 to secure the bottom end of the spring mounting seat 62 to the lower end 312 of the connecting section 311. The spring mounting seat 62 has a curved surrounding wall 621 that defines a front opening 620 and that is formed with an upper spring chamber 624 and a lower spring chamber 625. Each of the spring chambers 624, 625 is defined by an upper spring retaining portion and a lower spring retaining portion that project inwardly from the surrounding wall 621. The upper spring retaining portion includes a retaining wall 622 and a clamping wall 628 parallel to and spaced apart from the retaining wall 622 for cooperatively retaining an upper end portion of the compression spring 63 therebetween. The lower spring retaining portion includes an opposed pair of projecting ribs 623 to support a lower end portion of the compression spring 63. The surrounding wall 621 is further formed with upper and lower elongated second slots 626, 627 which are communicated respectively with the upper and lower spring chambers 624, 625. When the biasing unit 6 is mounted in the connecting section 311, one of the second slots 626, 627 is registered with the first slots 315 in the connecting section 311. In the present embodiment, the upper one of the second slots 626 is registered with the first slots 315 in the connecting section 311, and the compression spring 63 is disposed in the upper spring chamber 624 for retention between the upper and lower spring retaining portions of the upper spring chamber 624.

The linking rod 81 extends through a top end of the spring mounting seat 62 and through the coiled compression spring 63. The insert pin 74 extends through the upper spring chamber 624 and through the second slot 626, and is disposed below the compression spring 63 so as to be biased downwardly by the compression spring 63. Since the insert pin 74 extends through the lower positioning hole 811 of the linking rod 81, and since the insert pin 74 is normally biased downwardly by the compression spring 63, the linking rod 81 is pulled downwardly to normally bias the locking seat 7 to the locking position.

A decorative piece 9 may be mounted on the connecting section 311 such that, when the connecting section 311 is moved to the unfolded position, the decorative piece 9 fills up the curved notch 45 formed in the inner side wall 432 of the pivot seat 4.

Referring to FIGS. 2 and 4, when the stroller frame is unfolded, the connecting section 311 is disposed in the unfolded position, and the engaging chamber 72 in the locking seat 7 is aligned with the engaging protrusion 52 of the locking member 5. Since the compression spring 63 normally biases the insert pin 74 downwardly, the locking seat 7 is normally biased downwardly toward the locking member 5 to move to the locking position, in which the engaging protrusion 52 of the locking member 5 engages the engaging chamber 72 to lock the connecting section 311 in the unfolded position.

Figure 5:
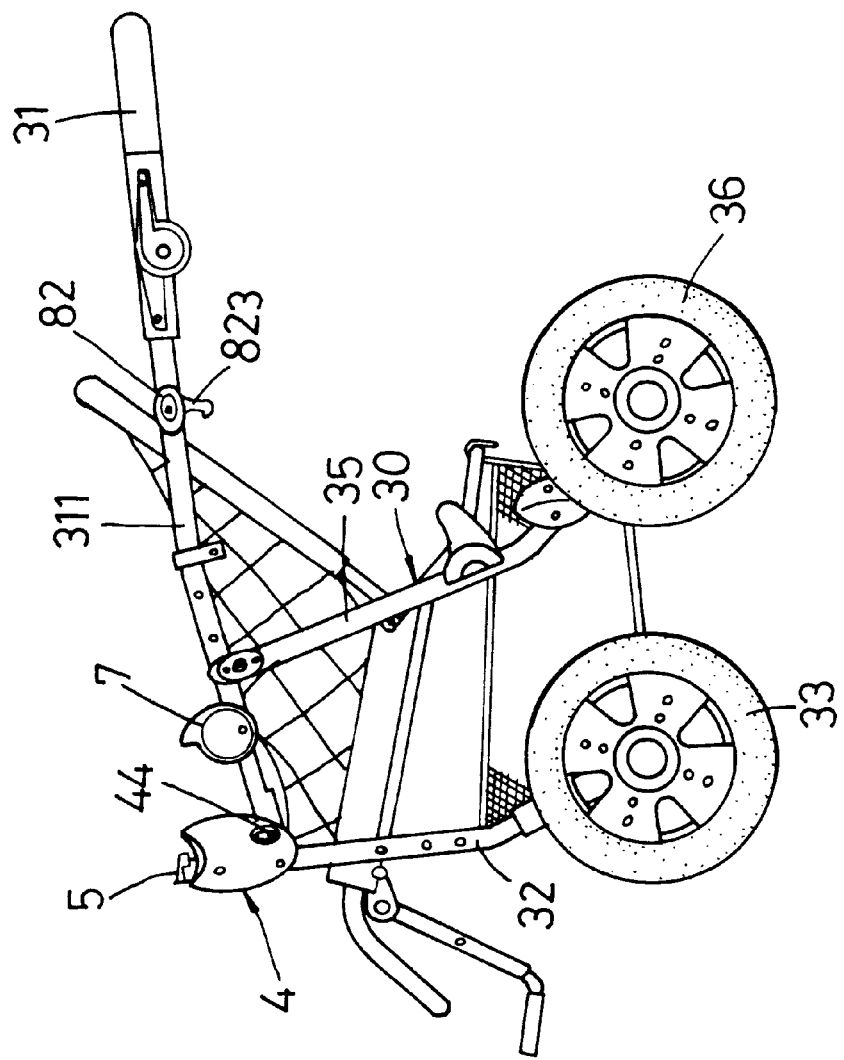
FIG. 5 is a schematic side view of the stroller of FIG. 2, illustrating the connecting device of the preferred embodiment when a handle portion of the stroller is disposed in a folded position.
Figure 7:
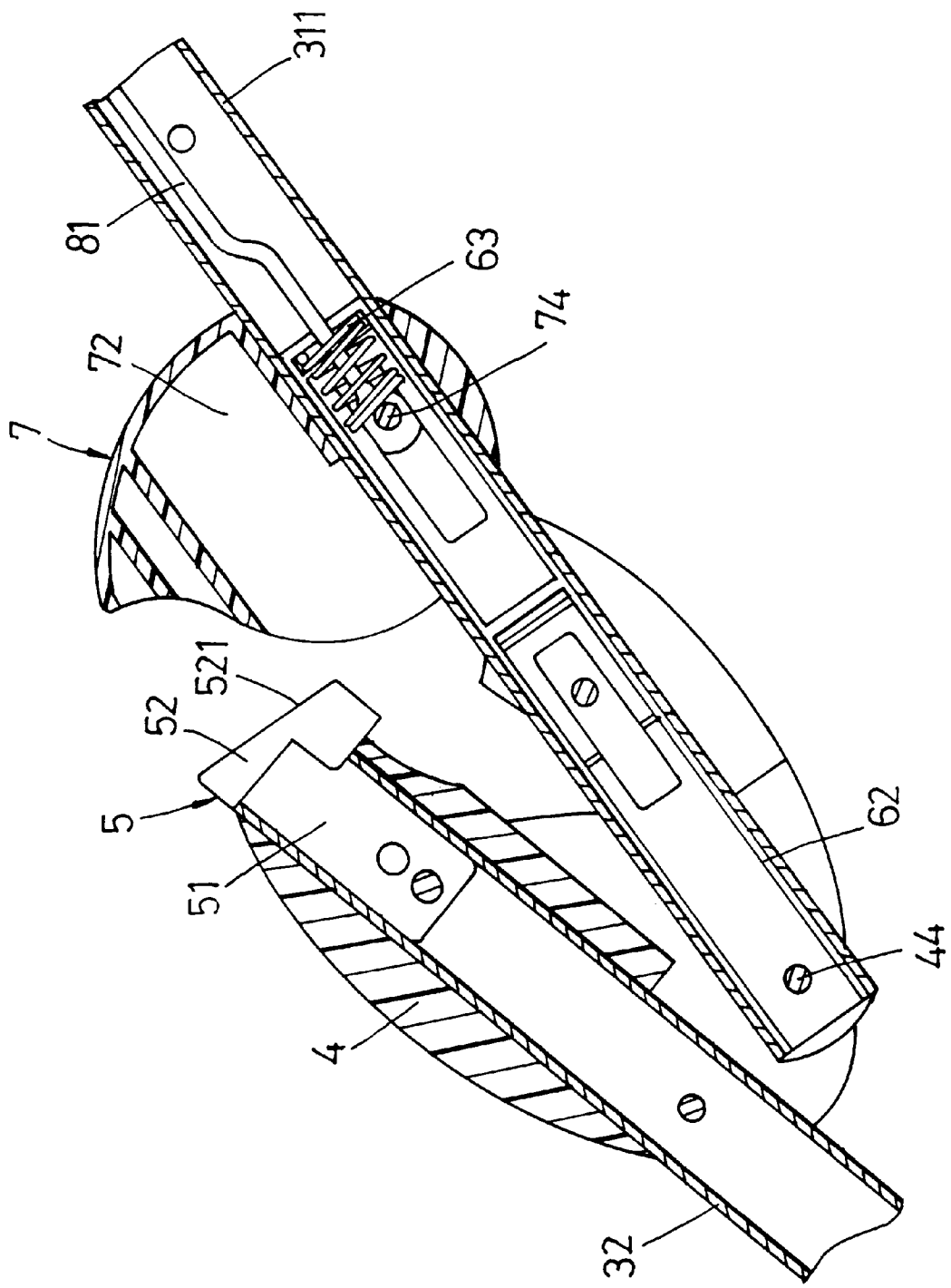
FIG. 7 is a fragmentary cross-sectional view illustrating the connecting device of the preferred embodiment when a handle portion of the stroller is moved away from the unfolded position.

Referring to FIGS. 5 and 7, when the stroller frame 30 is to be folded, the operating projection 823 of the operating member 82 is lifted upwardly to move the linking rod 81 and the insert pin 74 upwardly against the biasing action of the compression spring 63, thereby resulting in corresponding upward movement of the locking seat 7 away from the locking member 5 to move to the unlocking position, in which the engaging protrusion 52 of the locking member 5 is removed and is disengaged from the engaging chamber 72 to unlock the connecting section 311 from the front leg portion 32 and to permit movement of the connecting section 311 to the folded position. At this time, the connecting section 311 can be pivoted rearwardly and downwardly about the pivot shaft 44 relative to the front leg portion 32.

Figure 6:
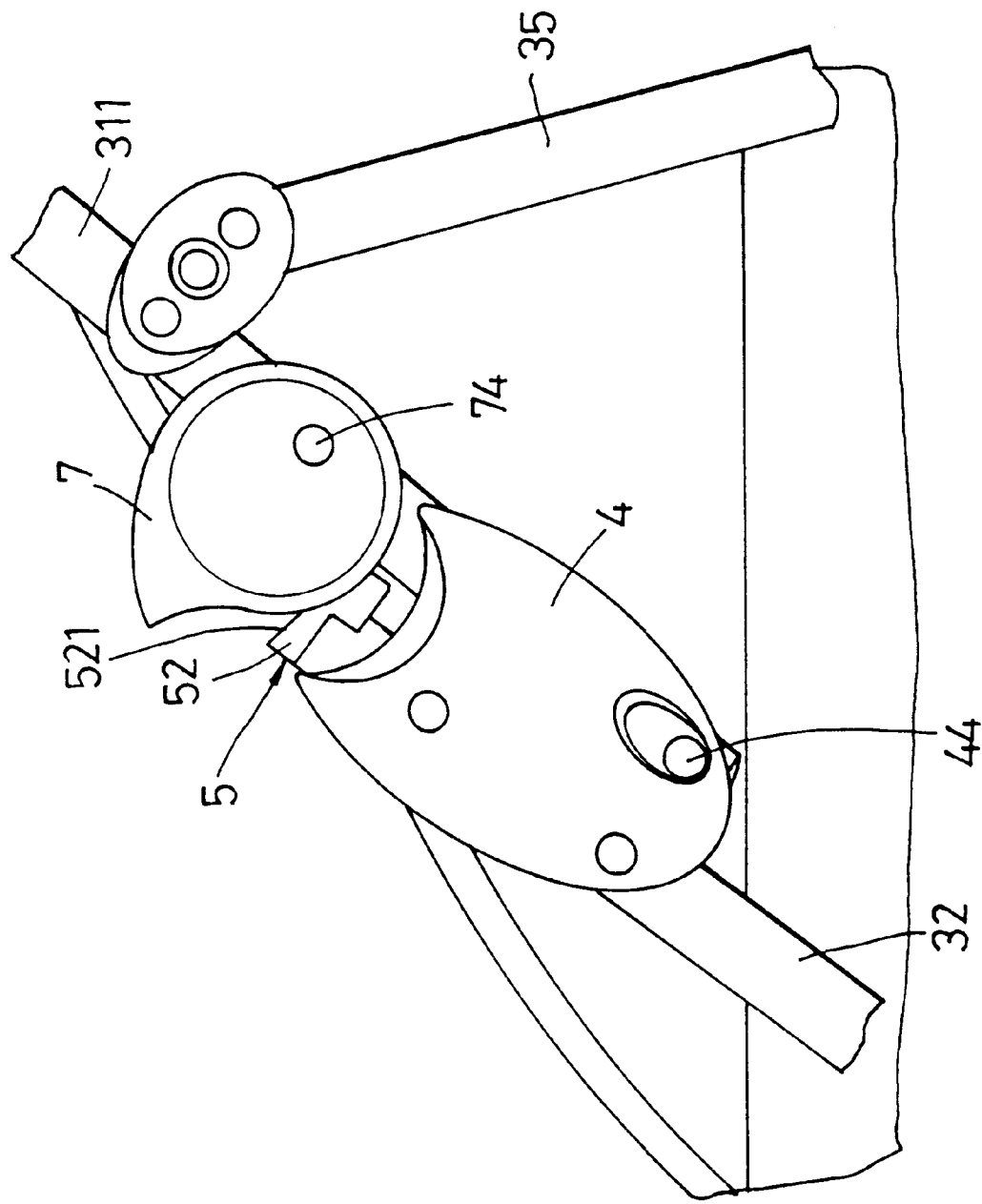
FIG. 6 is an enlarged fragmentary view illustrating the connecting device of the preferred embodiment when the locking seat is in an unlocked position.

Referring to FIGS. 6 and 7, when the connecting section 311 is pivoted from the folded position to the unfolded position about the pivot shaft 44 for unfolding the stroller frame 30, the locking seat 7 moves toward the locking member 5. At this time, the inclined top face 521 of the locking member 5 pushes the locking seat 7 upwardly against the biasing action of the compression spring 63 to permit the engaging protrusion 52 to extend into the engaging chamber 72 of the locking seat 7. The locking seat 7 can thus move automatically to the locking position.

In case the connecting device 3 of the present invention is to be mounted on another stroller frame which includes a handle portion with a connecting section formed with an elongated first slot much closer to the lower end of the connecting section such that it is the lower one of the second slots 627 in the spring mounting seat 62 that is registered with the first slot when the biasing unit 6 is mounted on the connecting section, the compression spring 63 should be disposed in the lower spring chamber 625 at this time.

It has thus been shown that, with the use of the compression spring 63 that is retained in the spring mounting seat 62, the biasing unit 6 can be easily mounted in the connecting section 311 of the handle portion 31. The production of the stroller frame 30 can thus be simplified with the use of the connecting device 3 of the present invention.

With this invention thus explained, it is apparent that numerous modifications and variations can be made without departing from the scope and spirit of this invention. It is therefore intended that this invention be limited only as indicated in the appended claims.

I claim:

1. A connecting device for connecting a handle portion and a leg portion of a stroller frame, the handle portion having a hollow connecting section formed with an elongated first slot, said connecting device comprising:

a pivot seat adapted to connect pivotally the connecting section of the handle portion and the leg portion such that the connecting section of the handle portion is pivotable relative to the leg portion between an unfolded position, in which the connecting section of the handle portion extends upwardly relative to the leg portion and is disposed side-by-side with the leg portion, such that the connecting section of the handle portion is generally parallel to the leg portion, and a folded position;

a locking seat adapted to be mounted slidably on the connecting section of the handle portion, said locking seat being adapted to be disposed above a top end of the leg portion when the connecting section of the handle portion is in the unfolded position, said locking seat being provided with a downwardly opening engaging chamber adapted to engage the top end of the leg portion, and an insert pin adapted to extend through the first slot in the connecting section so that said locking seat is adapted to move slidably on the connecting section of the handle portion between a locking position, in which said engaging chamber engages the top end of the leg portion to lock the connecting section of the handle portion in the unfolded position, and an unlocking position, in which said engaging chamber is disengaged from the top end of the leg portion to permit movement of the connecting section of the handle portion to the folded position;

an operating member adapted to be mounted slidably on the connecting section of the handle portion above said locking seat;

a linking rod adapted to be mounted on the connecting section of the handle portion, and having an upper end connected to said operating member, and a lower end connected to said insert pin; and a biasing unit adapted to be received in the connecting section of the handle portion, said biasing unit including an elongated spring mounting seat which has a bottom end adapted to be secured to the connecting section, and a top end that permits extension of said linking rod into said spring mounting seat, said spring mounting seat having a surrounding wall formed with upper and lower spring retaining portions which project inwardly from said surrounding wall and which define a spring chamber therebetween, said surrounding wall being further formed with an elongated second slot communicated with said spring chamber and adapted to be registered with the first slot in the connecting section, said biasing unit further including a coiled compression spring retained between said upper and lower spring retaining portions, said linking rod extending through said compression spring, said insert pin extending through said spring chamber and said second slot and being disposed below said compression spring so as to be biased downwardly by said compression spring, thereby pulling said linking rod downwardly to bias said locking seat normally to the locking position, said operating member being operable to move said linking rod upwardly against biasing action of the compression spring so as to move said locking seat to the unlocking position.

2. The connecting device as claimed in claim 1, wherein said upper spring retaining portion of said spring mounting seat includes a retaining wall and a clamping wall parallel to and spaced apart from said retaining wall, said retaining wall and said clamping wall cooperatively retaining a portion of said compression spring therebetween.

3. The connecting device as claimed in claim 1, further comprising a locking member adapted to be secured to the top end of the leg portion, said locking member being formed with an engaging protrusion which extends into said engaging chamber when said locking seat is disposed in the locking position, and which is removed from said engaging chamber when said locking seat is disposed in the unlocking position, said engaging protrusion having an inclined top face which pushes said locking seat upwardly against the biasing action of said compression spring so as to permit said engaging protrusion to extend into said engaging chamber of said locking seat and move said locking seat automatically to the locking position when the connecting section of the handle portion is pivoted from the folded position to the unfolded position.

* * * * *